(12) United States Patent
Morton et al.

(10) Patent No.: US 10,583,734 B2
(45) Date of Patent: Mar. 10, 2020

(54) TUBELESS LUBRICATION DELIVERY SYSTEM FOR A COMPACT TRANSFER CASE

(71) Applicant: BorgWarner Inc., Auburn Hills, MI (US)

(72) Inventors: Thad S. Morton, Seneca, SC (US); Mallikarjun Rudagi, Auburn Hills, MI (US); Michael Whitaker, Anderson, SC (US); Bo Yang, Central, SC (US); Stephen Tucker, Muncie, IN (US); Robert Harris, Pickens, SC (US)

(73) Assignee: BorgWarner Inc., Auburn Hills, MI (US)

( * ) Notice: Subject to any disclaimer, the term of this patent is extended or adjusted under 35 U.S.C. 154(b) by 387 days.

(21) Appl. No.: 15/586,859

(22) Filed: May 4, 2017

(65) Prior Publication Data

US 2018/0319276 A1 Nov. 8, 2018

(51) Int. Cl.
*B60K 17/346* (2006.01)
*B60K 23/08* (2006.01)
*B60K 17/344* (2006.01)

(52) U.S. Cl.
CPC ......... *B60K 17/346* (2013.01); *B60K 17/344* (2013.01); *B60K 23/08* (2013.01); *B60K 23/0808* (2013.01); *B60K 2023/0816* (2013.01); *B60K 2023/0825* (2013.01); *B60Y 2306/03* (2013.01); *B60Y 2410/10* (2013.01)

(58) Field of Classification Search
CPC .................................................. B60K 17/346
See application file for complete search history.

(56) References Cited

U.S. PATENT DOCUMENTS

| | | | | | |
|---|---|---|---|---|---|
| 5,584,776 | A | * | 12/1996 | Weilant | B60K 17/3505 475/213 |
| 5,595,214 | A | * | 1/1997 | Shaffer | B60K 17/20 137/513.5 |
| 5,620,072 | A | * | 4/1997 | Engle | B60K 17/342 180/247 |
| 5,702,321 | A | * | 12/1997 | Bakowski | B60K 17/3467 180/249 |
| 5,704,863 | A | * | 1/1998 | Zalewski | B60K 17/344 180/247 |
| 5,704,867 | A | * | 1/1998 | Bowen | B60K 17/3462 475/205 |
| 5,938,556 | A | * | 8/1999 | Lowell | F16H 48/08 475/233 |

(Continued)

*Primary Examiner* — Joseph M Rocca
*Assistant Examiner* — Conan D Duda
(74) *Attorney, Agent, or Firm* — Warn Partners, P.C.

(57) ABSTRACT

A transfer case for a normally rear wheel drive vehicle with selective four wheel drive capabilities is provided. The transfer case has an intermediate gear driven lubrication pump, wherein the machining required for the lubrication pump is almost exclusively conducted from an interior side of the rear shell. The transfer case of the present invention also eliminates the requirement for a cover plate for the pump and an external lubrication tube. The transfer case of the current invention has an internal lubrication pump outlet which has a portion extending in a reinforcing mound of the rear shell thereby providing greater stiffness to a portion of the rear shell supporting the main input shaft rear bearings.

12 Claims, 8 Drawing Sheets

(56) References Cited

U.S. PATENT DOCUMENTS

| | | | | |
|---|---|---|---|---|
| 5,964,126 | A * | 10/1999 | Okcuoglu | B60K 17/3505 74/650 |
| 6,041,903 | A * | 3/2000 | Burns | F16D 43/284 192/103 F |
| 6,076,646 | A * | 6/2000 | Burns | F16D 25/0638 192/103 F |
| 6,155,947 | A * | 12/2000 | Lowell | F16H 48/08 475/233 |
| 6,168,545 | B1 * | 1/2001 | Lowell | F16H 48/08 475/231 |
| 6,419,607 | B1 * | 7/2002 | Wild | F16H 48/08 475/88 |
| 6,790,013 | B2 * | 9/2004 | Hunter | F01C 21/0836 184/6.16 |
| 7,753,173 | B2 * | 7/2010 | Gratzer | B60K 17/344 184/6.12 |
| 2002/0079180 | A1 * | 6/2002 | Mohan | F16D 25/0638 192/35 |
| 2003/0114264 | A1 * | 6/2003 | Duan | B60K 17/35 475/231 |
| 2007/0026983 | A1 * | 2/2007 | Shimizu | B60K 17/344 474/43 |
| 2007/0034475 | A1 * | 2/2007 | Capito | B60K 23/0808 192/85.63 |
| 2016/0290484 | A1 * | 10/2016 | Lenczewski | F16H 57/0483 |
| 2017/0082190 | A1 * | 3/2017 | Jongebloed | F16D 13/74 |
| 2017/0368933 | A1 * | 12/2017 | Drill | B60K 17/344 |
| 2018/0147939 | A1 * | 5/2018 | Sharma | B60K 23/0808 |
| 2018/0209533 | A1 * | 7/2018 | Palazzolo | B60K 17/02 |

\* cited by examiner

TUBELESS LUBRICATION DELIVERY SYSTEM FOR A COMPACT TRANSFER CASE

FIELD OF THE INVENTION

The field of the present invention is that of transfer cases for normally two wheel rear drive mode vehicles with selective four wheel all-wheel-drive mode of operation.

BACKGROUND OF THE INVENTION

Many automotive vehicles have rear wheel drive. Additionally many automotive vehicles with rear wheel drive have selective four wheel drive capabilities which are actuated upon operator command or automatically actuated in response to a slip condition of the powered rear wheels of the vehicle. To provide four wheel drive capabilities in the vehicle, there is provided a transfer case. The transfer case is typically provided at an output of the vehicle's transmission. Referring to FIGS. 1-4, the transfer case 7 often has an outer housing provided by front shell and rear shell 12. In many transfer case designs, a front axle gear (not shown) is supported in the front and rear shells and rotates about a secondary axis. The front axle gear is torsionally connected with a front axle differential of the vehicle. An idler or intermediate gear 42 is supported by the housing. The intermediate gear is meshed with the front axle gear. A main input shaft 30 rotates about a coaxially aligned primary axis generally parallel to the secondary axis. The main input shaft 30 is rotatively supported by the front shell and rear shell 12. The main input shaft 30 is torsionally connected with an output shaft of the transmission of the vehicle and with a rear axle (via a prop shaft and rear differential) of the vehicle. A main sprocket gear 50 is provided that is rotatably mounted on the main input shaft 30. The main sprocket gear 50 is meshed with the intermediate gear 42. A clutch mechanism is provided to selectively torsionally connect the main sprocket gear with the main input shaft.

To lubricate the bearings supporting the main input shaft and a friction pack 12 of the clutch mechanism there is provided a gerotor pump. The intermediate gear 42 powers the gerotor pump. In many transfer case applications, the rear shell 12 is a casting. An interior of the rear shell is machined for placement of a roller bearing 46 to support a rear end of the intermediate gear 42. An exterior portion of the rear shell is machined to provide a fluid intake or inlet port 31 for the gerotor pump 41. Concentric with the inlet port of the gerotor pump, the exterior of the rear shell is machined for acceptance of inner 43 and outer 47 rotor gears of the gerotor pump. A central bore is provided connecting the interior and exterior of the rear shell 12 for receipt of a shaft 52 connected with the intermediate gear 42 to power the gerotor pump. An exterior of the gerotor pump 41 is sealed by a cover plate 49 that is boltably connected to the rear shell. An outlet port 51 of the gerotor pump feeds into an external lubrication tube 53. The external lubrication tube re-enters the rear shell connecting with a passage 57 of the rear shell that delivers lubricant to a portion of the main input shaft that has a radial passage, allowing for lubricant to enter into a central bore 59 of the main input shaft. The lubricant enters the main input shaft adjacent an area of the main input shaft that is supported by the rear bearing 46 and then exits the main input shaft through another radial passage to lubricate a clutch mechanism 63 of the transfer case.

A factor that can contribute to the cost and or reliability of the transfer case is that the rear shell of the transfer case is machined from an interior side for mounting the bearing 46 supporting the intermediate gear 42, then is also machined from the exterior side to provide an inlet port and for a section supporting the inner and outer rotors 43,47 of the gerotor pump. Additional costs are incurred to ensure the concentricity of the portion of the rear shell that is machined from the exterior side versus the portion of the rear shell machined from the exterior side. It is desirable that all required machining for the lubrication pump be from one side of the rear shell. Another challenge is that the inlet port is typically directly machined into the rear shell exterior side. If the transfer case 7 is being utilized on various vehicles with different lubrication requirements, it is often desirable to slightly modify the radial position of the inlet port and thus there can be a requirement for a customized machining of the rear shell for the different vehicles. It is desirable provide a transfer case design wherein the inlet port of the gerotor pump can be modified without requiring different machining operations in the rear shell.

As mentioned previously, the aforementioned transfer case design requires a cover plate to seal the gerotor pump in the rear shell. The cover plate must be secured by bolt fasteners and the cover plate must be sealed. In some applications the fastener bolts must additionally be sealed. Still another challenge of the aforementioned transfer case design is the cost and installation of an external lubrication tube 53. The ends of the external lubrication tube must be sealed and are also subject to a pull test during assembly to ensure proper installation. It is desirable that the external lube tube be eliminated from the design. Still another factor to consider is the stiffness of the rear shell in the area of the rear shell supporting the rear bearing supporting the main input shaft. It is desirable that this aforementioned area of the rear shell be as stiff as possible.

SUMMARY OF THE INVENTION

To make manifest the above noted and other gainful desires, a revelation of the present invention is brought forth. The present invention endows a freedom of a transfer case for a normally rear wheel drive vehicle with selective four wheel drive capabilities, wherein the transfer case has an intermediate gear driven lubrication pump, wherein the machining required for the lubrication pump is almost exclusively conducted from an interior side of the rear shell. The transfer case of the present invention also eliminates the requirement for a cover plate for the pump and an external lubrication tube. The transfer case of the current invention has an internal lubrication pump outlet which has a portion extending in a reinforcing mound of the rear shell thereby providing greater stiffness to a portion of the rear shell supporting the main input shaft rear bearings. Since the external lubrication tube of the prior transfer case is eliminated thereby deleting any requirement for a pull test to ensure proper installation of the external lubrication tube to the rear shell. Accordingly the transfer case of the present invention increases reliability and lowers manufacturing costs allowing the benefits of increased safety provided by such a transfer case to be enjoyed by a greater portion of the populace.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
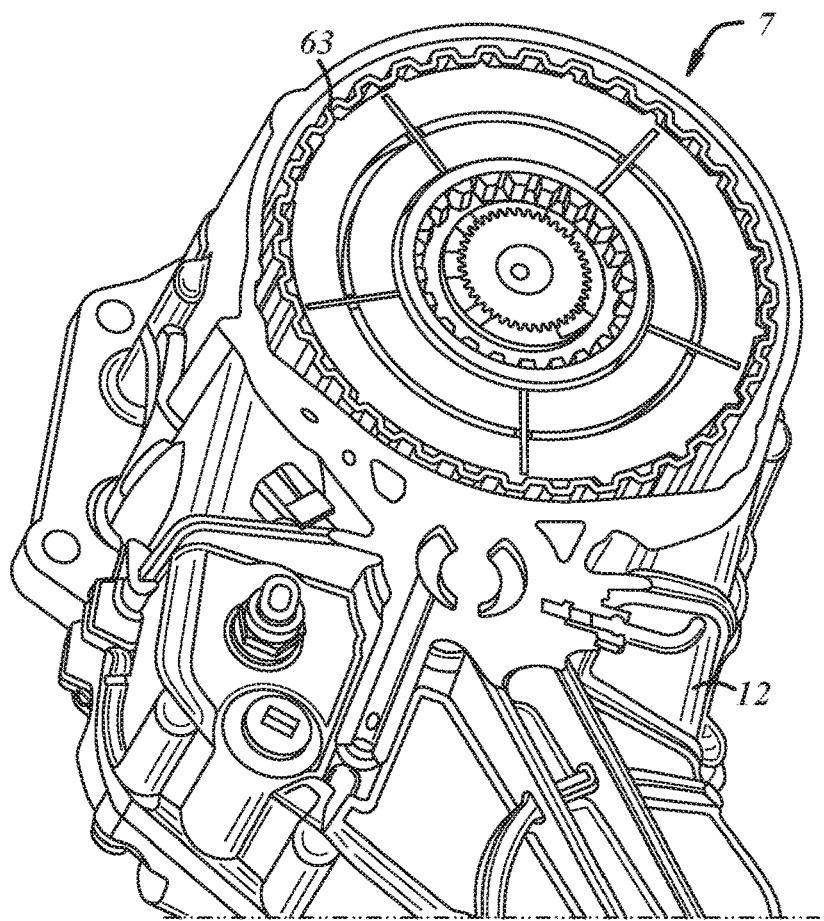
FIG. 1 is a section view partially shown in perspective of a prior art transfer case.
Figure 2:
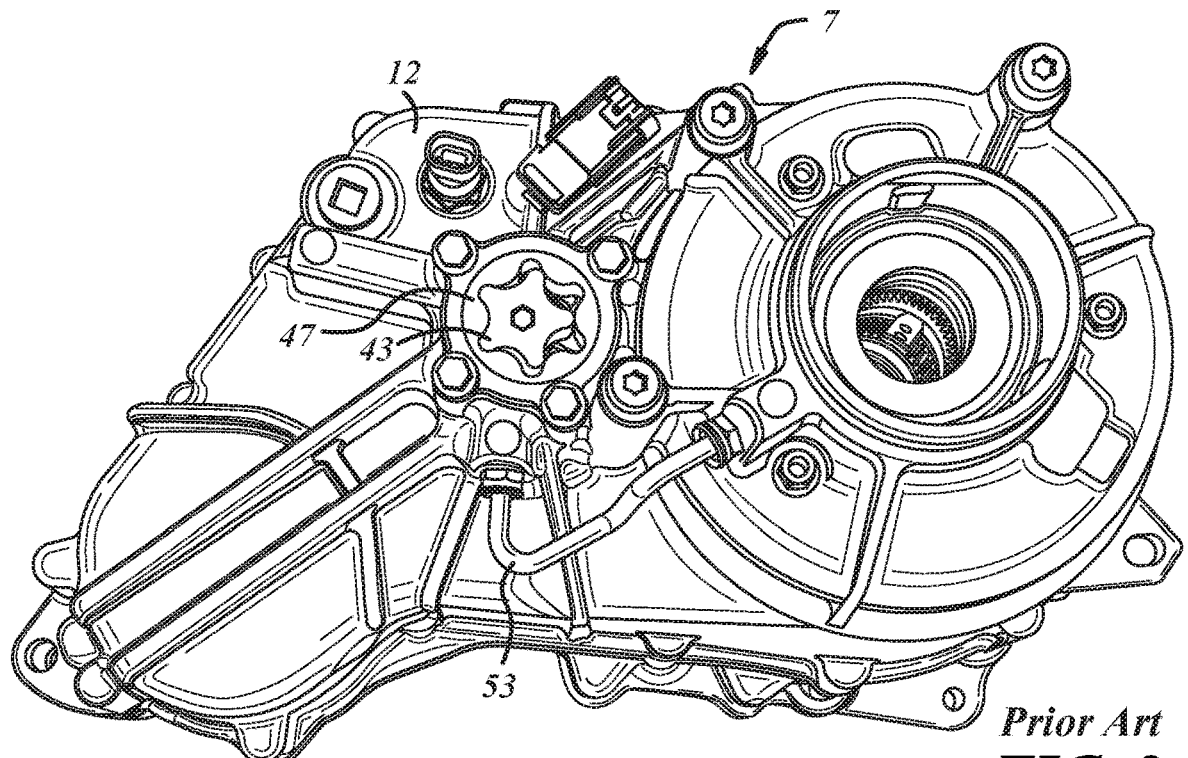
FIG. 2 is a perspective view of the transfer case shown in FIG. 1 with a cover plate of a gerotor lubrication pump being removed for purposes of illustration.
Figure 3:
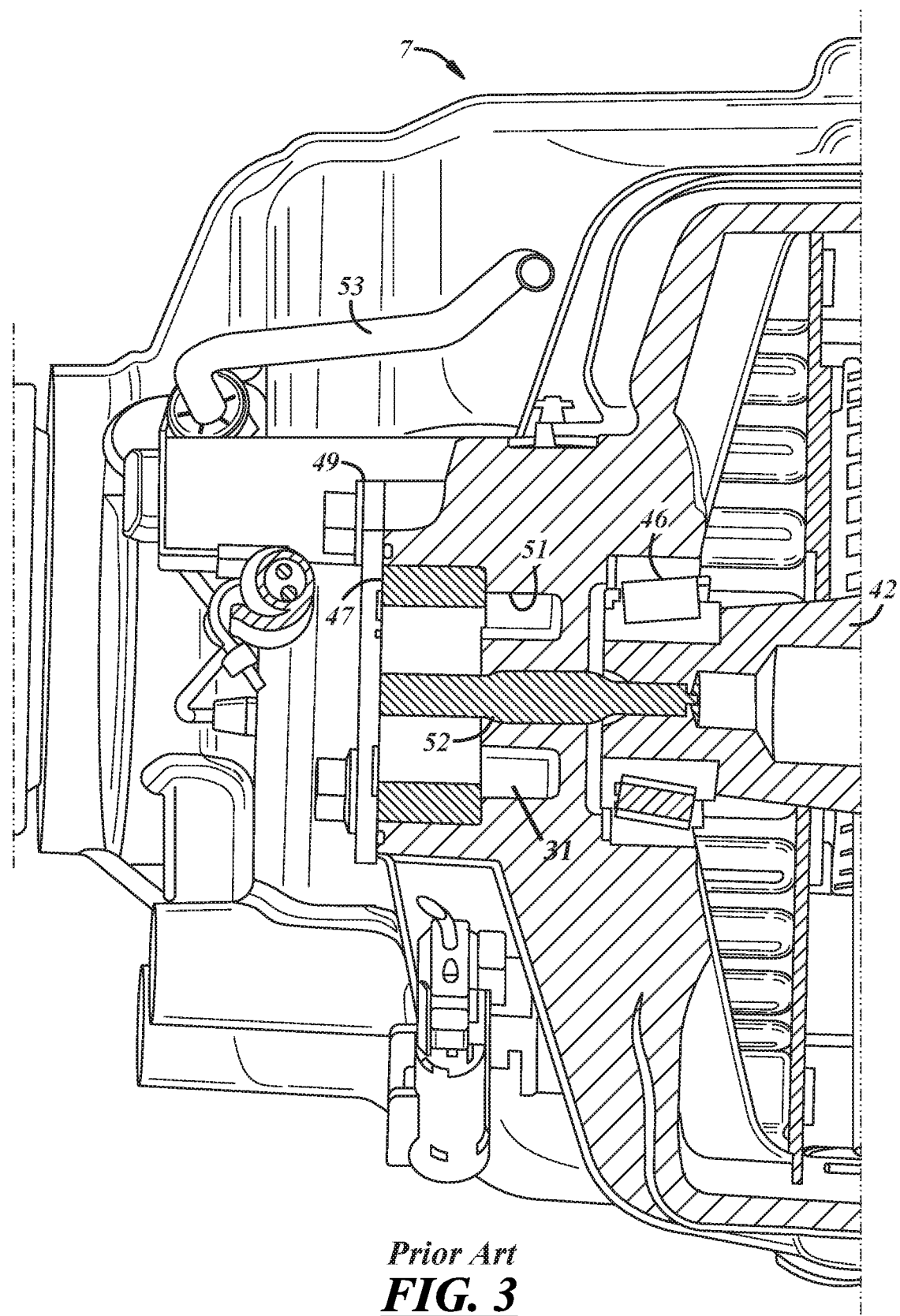
FIG. 3 is a partial sectional view of the transfer case shown in FIG. 1.
Figure 4:
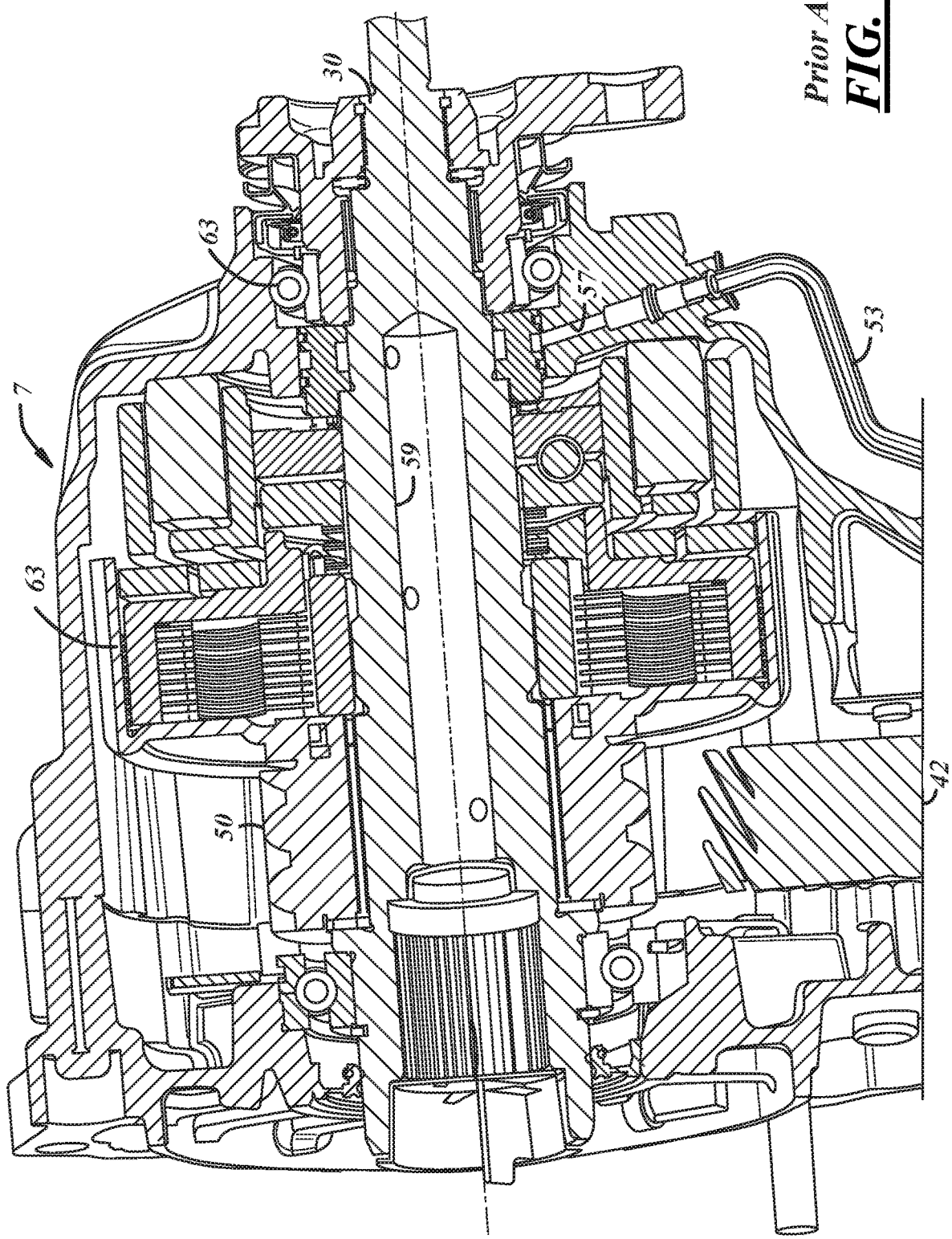
FIG. 4 is another sectional view of the transfer case shown in FIG. 1.
Figure 5:
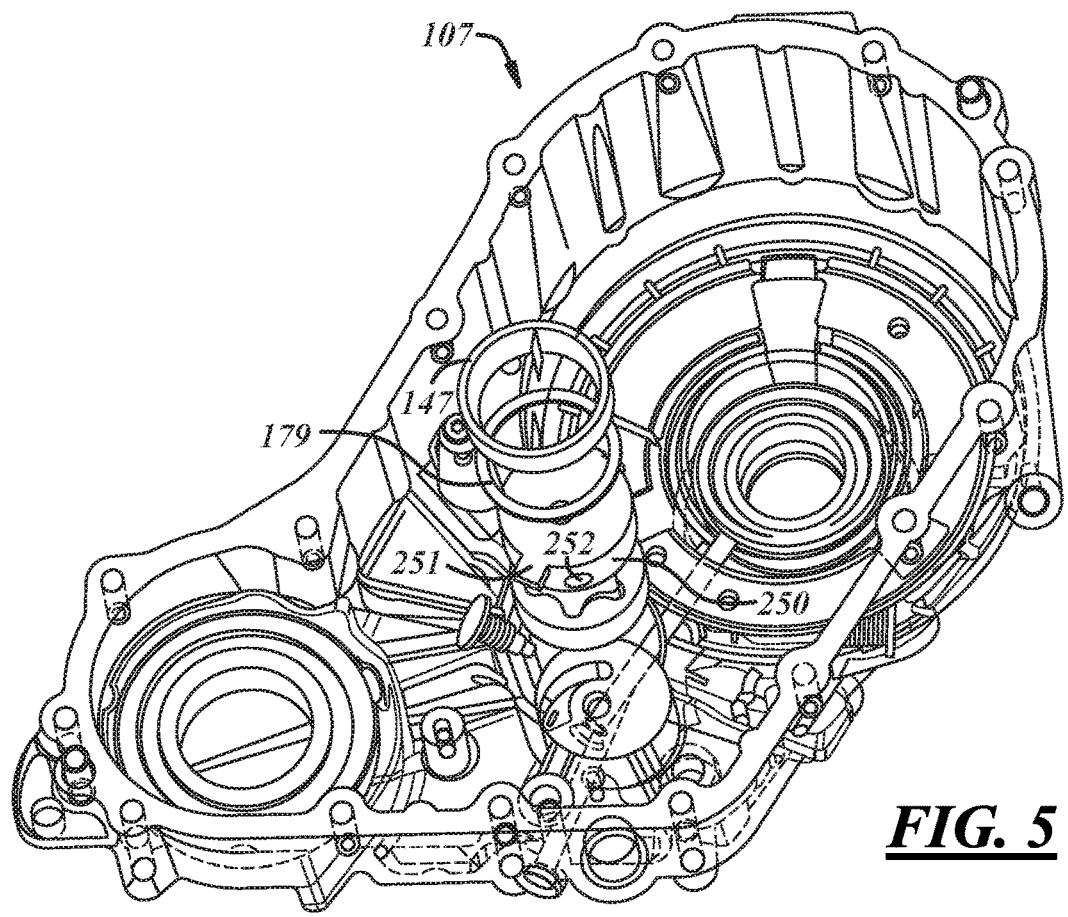
FIG. 5 is an exploded view of a preferred embodiment transfer case according to the present invention.
Figure 6:
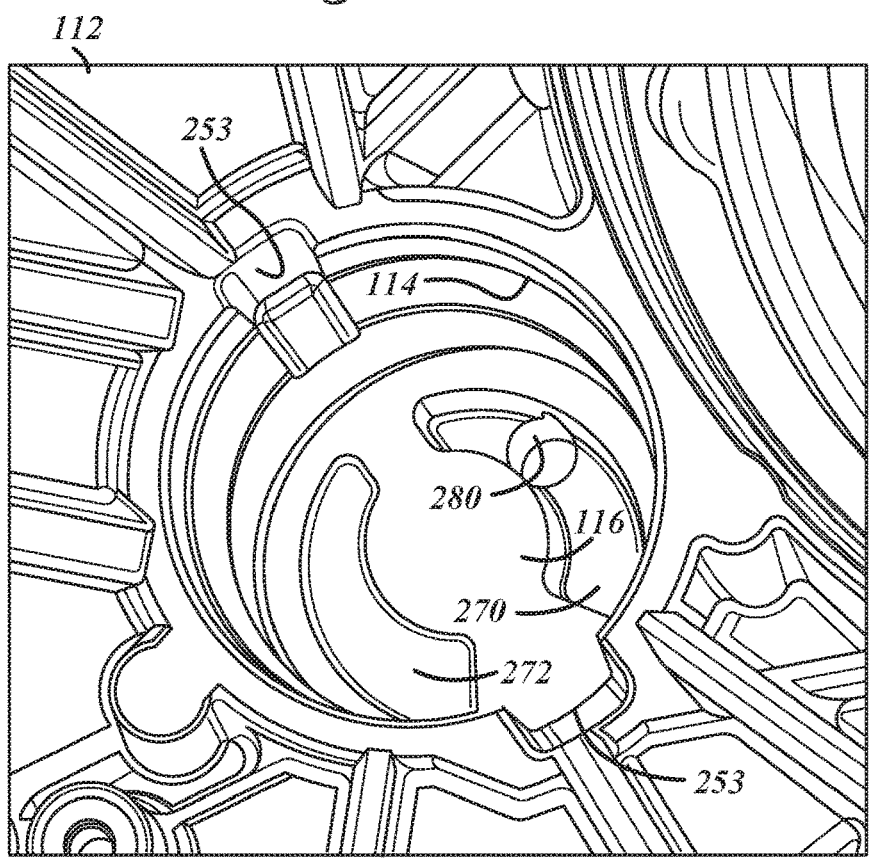
FIG. 6 is an enlarged view of an interior portion of a rear shell of the transfer case of the present invention showing details of the machining adjacent the gerotor lubrication pump.
Figure 7:
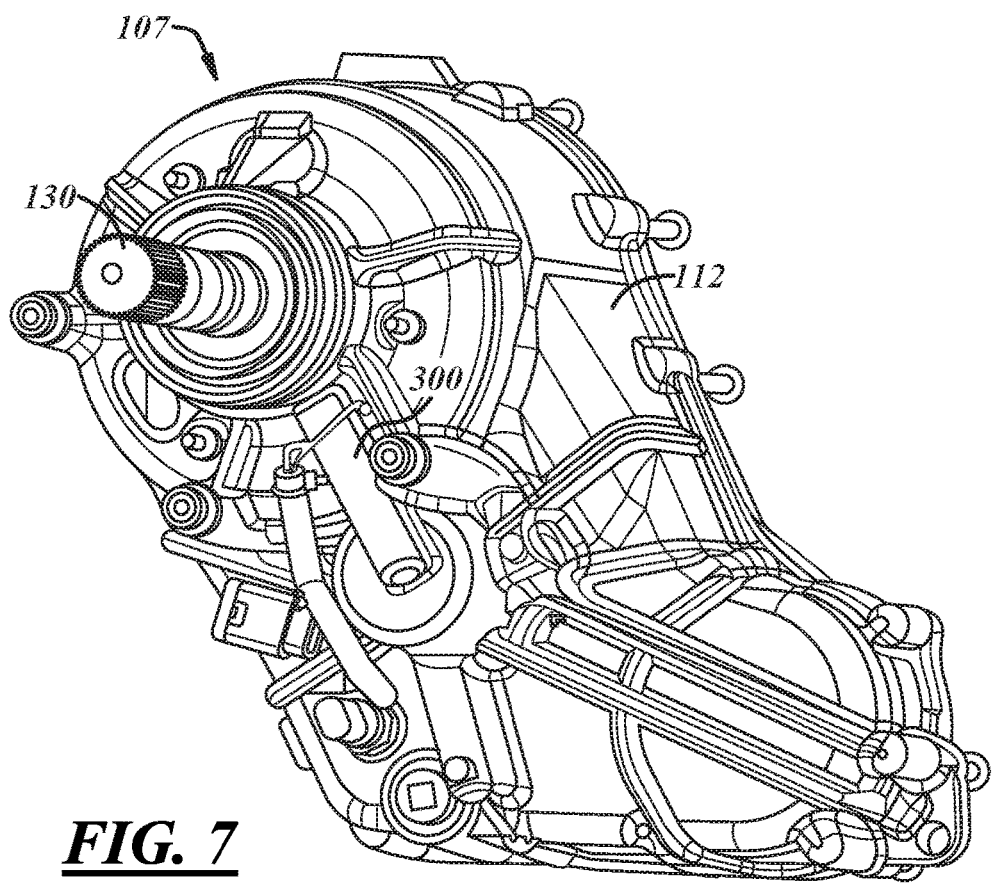
FIG. 7 is a perspective view of the transfer case shown in FIG. 5.
Figure 8:
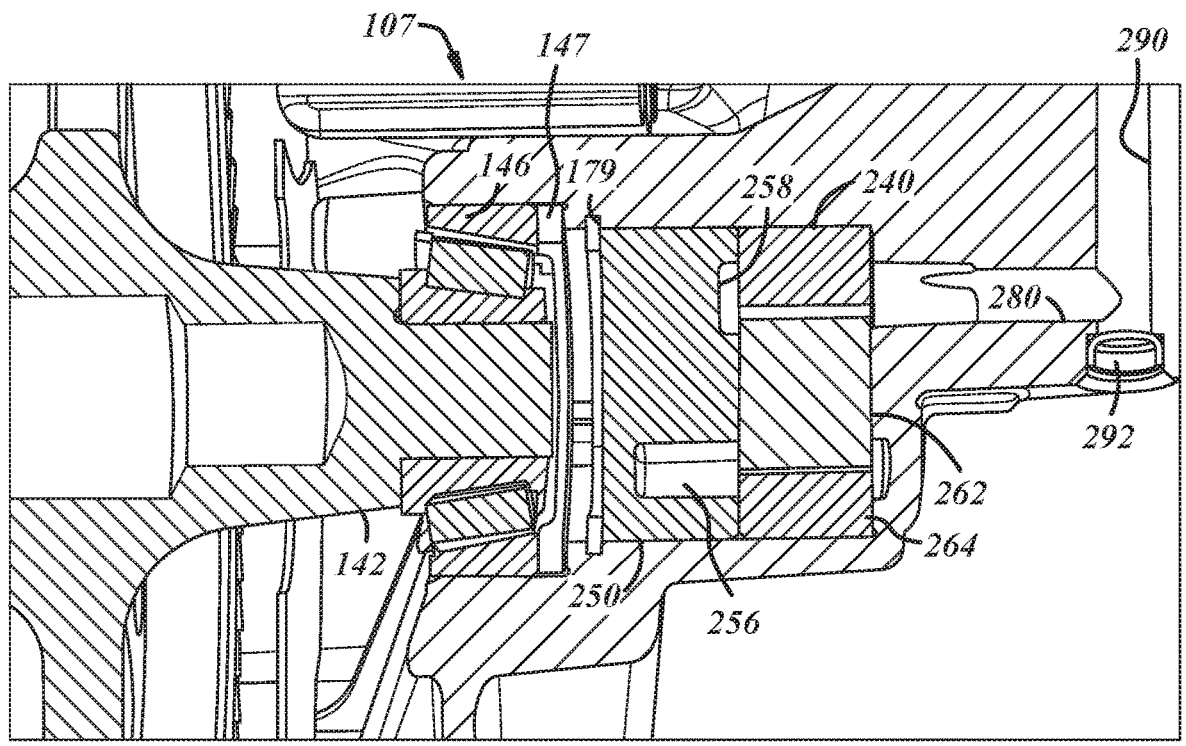
FIG. 8 is a sectional view slightly off center from the rotational axis of the gerotor pump in the transfer case of the present invention.
Figure 9:
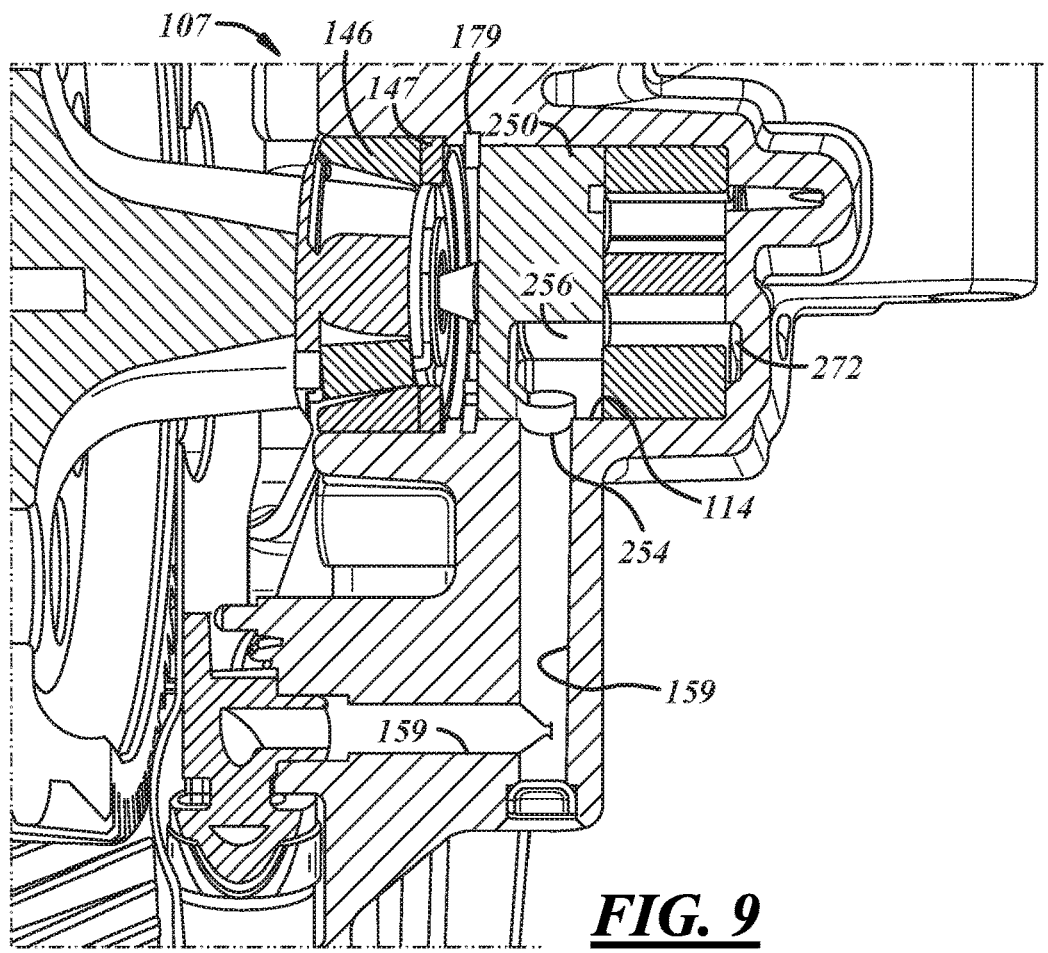
FIG. 9 is another sectional view slightly off center of the rotational axis of the gerotor pump in the transfer case of the present invention.
Figure 10:
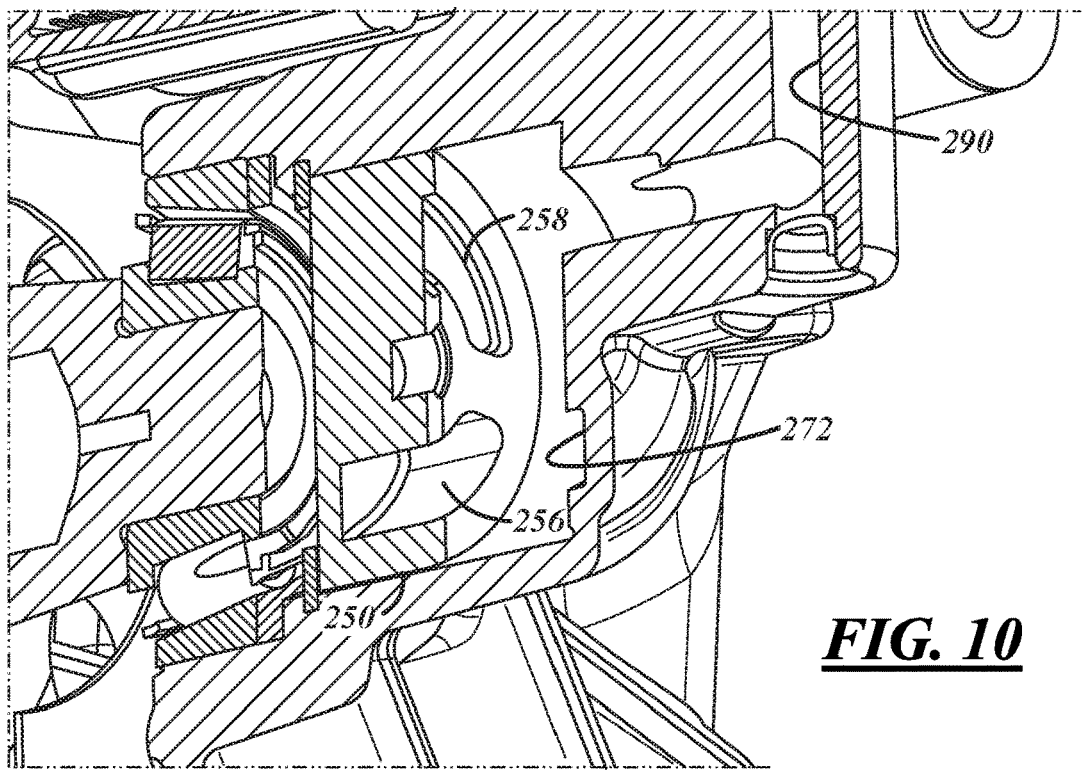
FIG. 10 is yet another sectional view shown partially in perspective of the gerotor pump of the present invention with the inner and outer rotors removed for clarity of illustration.
Figure 11:
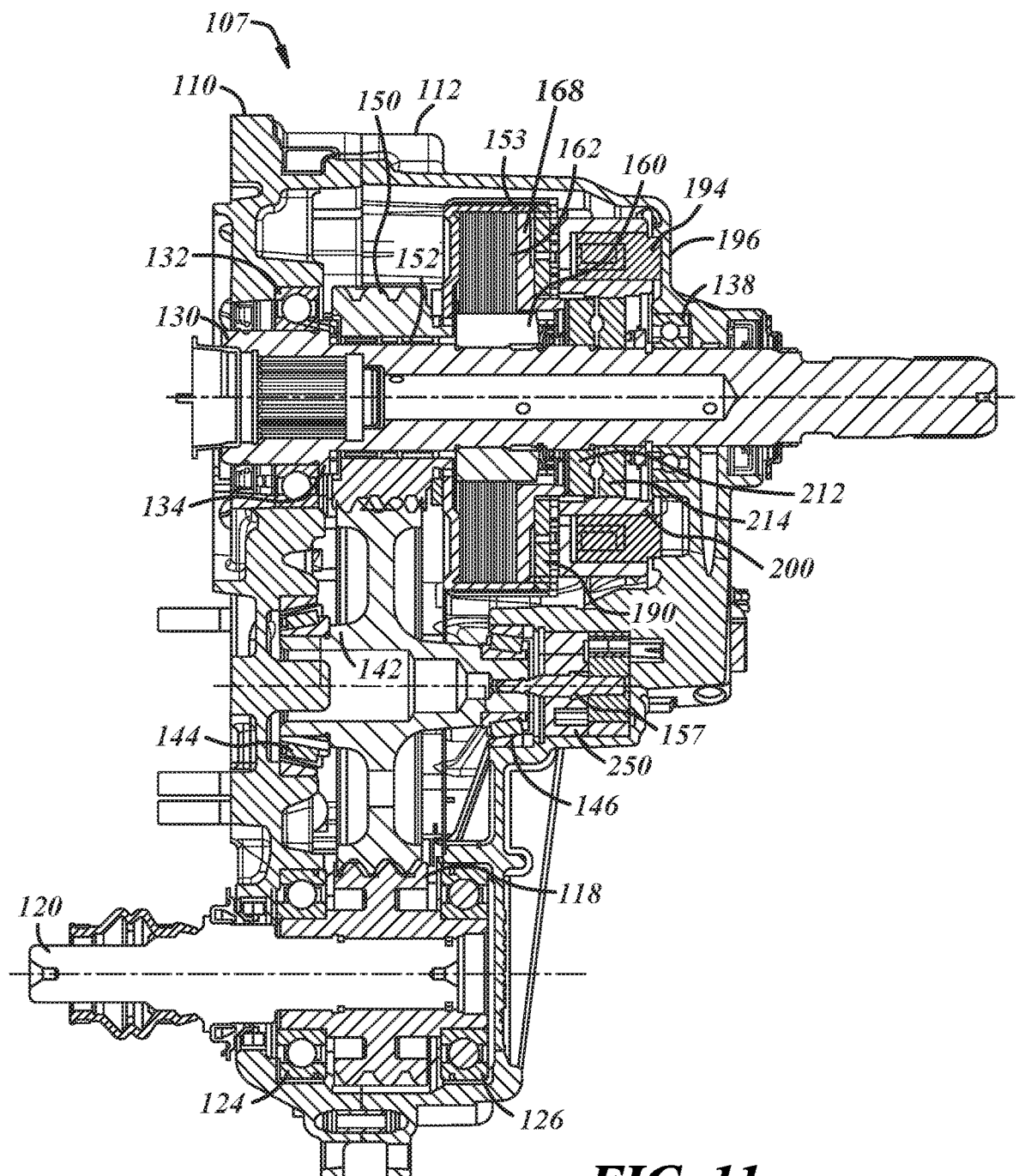
FIG. 11 is a sectional view of the transfer case of FIG. 5 further illustrating a front axle output gear.
Figure 12:
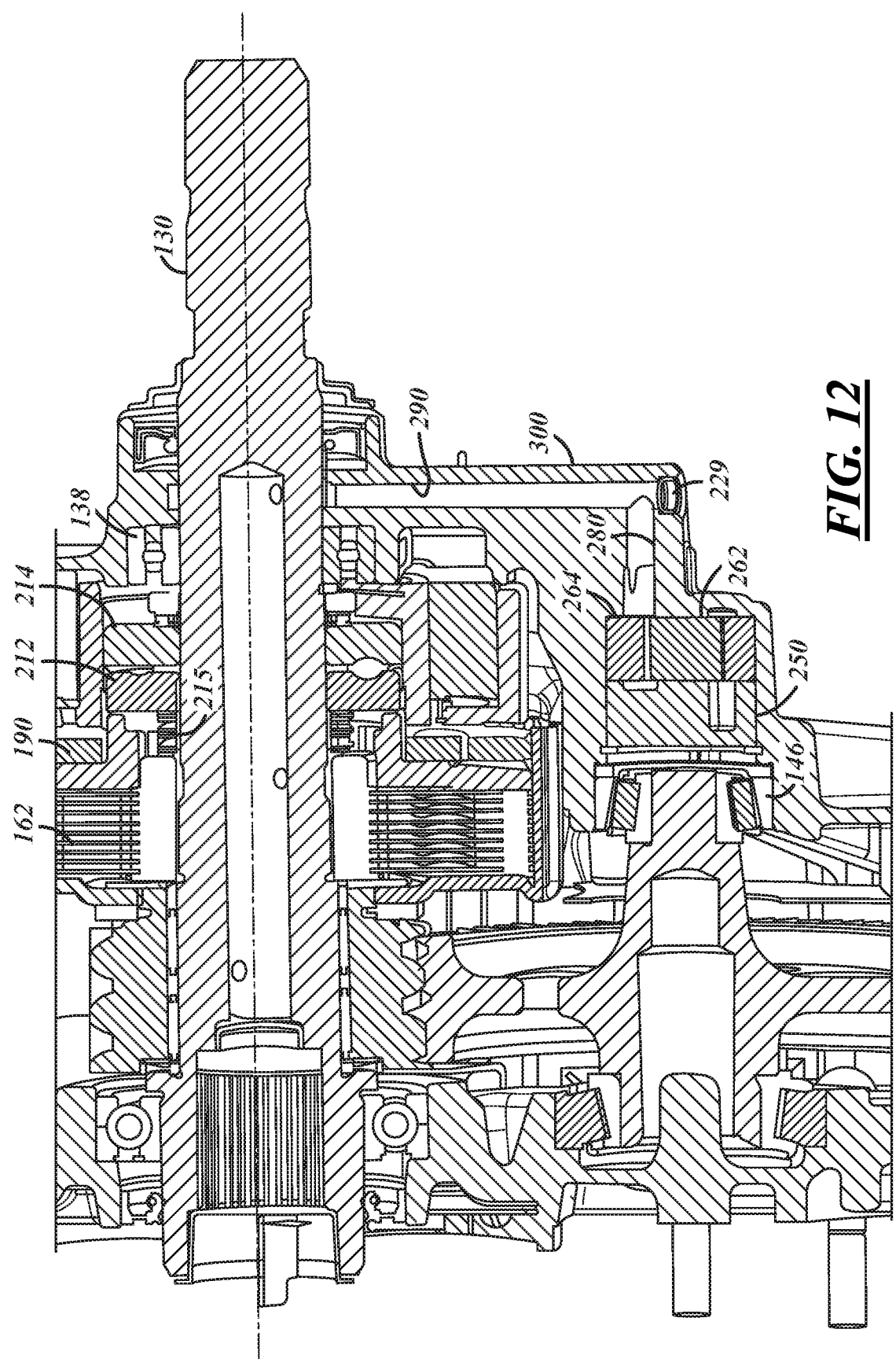
FIG. 12 is yet another sectional view of the transfer case shown in FIG. 5.

Referring to FIGS. 5 through 12, a transfer case 107 of the present invention is brought forth. Transfer case 107 has a housing formed from a front shell 110 that is boltably connected to a rear shell 112. The rear shell has a generally cylindrical interior depression 114. The cylindrical depression 114 has a blind end 116. The rear shell is typically fabricated from a steel or aluminum casting that is subsequently finished machined. Typically, the front shell 110 is fabricated by a steel or aluminum casting subsequently machined.

A front axle output gear 118 is provided for powering a front axle of the vehicle. The front axle output gear 118 is torsionally connected with a front axle output shaft 120. Front axle output shaft 120 is torsionally connected to a front differential (not shown) either directly or through a coupling. The front axle output gear 118 is supported by a front bearing 124 and a rear bearing 126. The bearings 124 and 126 are installed to their respective shells from an interior of the shells 110 and 112.

A main input shaft 130 is provided. The main input shaft 130 is torsionally connected with a transmission (not shown). The main input shaft is also connected with a rear axle (not shown) via an optional coupling and prop shaft and rear differential. As shown, the main input shaft is directly supported in the front shell 110 by a front bearing 132. The main input shaft 130 has a shoulder 134 to abut an inner race 136 of the bearing 132. The shoulder 134 axially limits the position of main input shaft with respect to the front shell 110. A rear end of the main input shaft is supported in the rear shell 112 by a rear bearing 138. Bearings 132 and 138 are installed into the respective shells 110, 112 from an interior side of their respective shells.

An idler gear 142 is provided that is meshed with front axle output gear 118. The idler gear 142 is rotatably supported in the front 110 shell and rear shell 112 by tapped rolling bearings 144 and 146. Both of the bearings 144 and 146 are installed from an interior of their respective shells. A shim 147 is provided to allow for proper axial positioning of the bearing 146.

A sprocket gear 150 is provided that is rotatably mounted on the main input shaft 130 by needle bearings 152. The sprocket gear 150 is meshed with the idler gear 142. A clutch housing 153 is torsionally connected with the sprocket gear 150. A hub 160 is provided torsionally connected to the main input shaft 130. A friction pack (sometimes referred to as a clutch pack) 162 is provided for selectively torsionally connecting the clutch housing 150 with the hub 160. Typically, the friction pack 162 includes a set of plates splined to the interior of the clutch housing interposed by plates splined to the hub 160. Typically, one of the sets of plates is covered by a friction lining on one or both sides. To actuate the friction pack 162 there is provided a pressure plate 168. The pressure plate 168 is torsionally connected on the hub and can axially move thereon. When the pressure plate 168 is actuated, the main input shaft 130 is torsionally connected with the front axial shaft 120.

An armature 190 is provided which is torsionally axially movable and connected by a splined interface with an interior of the clutch housing. A coil 194 is provided fixedly connected to a bell housing portion 196 of the rear shell. Covering and surrounding the coil is a U-shaped coil housing 200. A ball ramp is provided. The ball ramp has a first member 212 axially spring biased away from the pressure plate 168 by a spring 215 that contacts the hub 160. The first member 212 of the ball ramp is axially slidable and torsionally fixed to the main input shaft 130. The ball ramp has a second member 214 which is torsionally fixed to the coil housing 200 (by welding or other means) and allows the coil housing 200 to be rotatably mounted on the main input shaft 130. Relative rotation between the first and second members of the ball ramp 210 causes an axial separation between the first and second ball ramp members thereby causing the pressure plate to actuate the friction pack 162. Activation of the coil 194 causes the armature 190 to be magnetically connected with the coil housing 200 thereby causing the clutch housing 153 to be torsionally affixed with the ball ramp second member 214. Since the clutch housing is typically stationary (if the front axle shaft is not connected with the front differential) until actuation of the friction pack 162, there will be extreme relative rotation movement between the ball ramp second member 214 and first member 212 since the main input shaft is rotating. Thereby relative rotation of movement between the first and second members 212, 214 of the ball ramp actuates the clutch pack 162. When the coil is de-energized, the coil housing 200 is no longer magnetically attracted to the armature 190 and therefore the second member ball ramp 214 is no longer torsionally associated clutch housing 153.

As mentioned previously, a gerotor pump lubrication 240 is powered by the idler gear 142. The gerotor pump 240 is fitted within the cylindrical depression 114. The gerotor pump 240 has an insertable inlet port 250 held axially in position by snap ring 179. The inlet port insert 250 has a generally radial inlet 252 intersecting with an oil inlet 254 radially intersecting the cylindrical depression 114. Inlet 254 is connected via multi-legged passage 159 with a lower sump of the transfer case 107. The inlet port insert 250 has a cashew shaped (as used herein cashew shaped refers to a cashew nut shape or more particularly to an arched or arcuate shape which tapers in width from one end to another) pocket 256 to distribute oil and a pressure equalization pocket 258. The pressure equalization pocket helps to prevent vibration due to unequal hydraulic forces acting on the port insert 250. The inlet port insert 250 has one or more radial tabs 251 to fit into radial slots 253 of the shell to prevent the insert from rotating. If desired the tabs and slots can be customized to make sure the inlet port insert 250 is installed in the proper radial position to ensure the proper orientation of the inlet 252 with the cylindrical depression inlet 254. If it is desired to modify the fluid capabilities of the pump, a different insert can be installed with different sized or radially located distribution pocket and pressure equalization pocket.

The gerotor pump 240 inner and outer rotors 262,264 are positioned rearward of the inlet port insert 250. The rotors are powered by the idler gear 142 via a shaft 157. Cylindrical depression blind end 116 also has a machined out pressure equalization pocket 272. The blind end 116 also has a cashew shaped cut out 270 for an oil distribution portion that is machined into the blind end 216 of the cylindrical depression. Intersecting the cashew shaped cut out 270 fluid distribution portion is an outlet. The outlet has a first part 280 generally parallel with the axis of rotation of the main input shaft 130. The outlet has a second part 290 which extends generally perpendicular to the main input shaft 130. The second part of the outlet is placed in a reinforcing mound 300 of the rear shell 112. The second part 290 of the outlet intersects the main input shaft rearward of the rear bearing 138 supporting the main input shaft 130. The second part 290 of the outlet has an end plug 292. The reinforcing mound 300 of the rear shell causes the rear shell to be reinforced at a portion of highest stress in the rear shell which is that portion of the rear shell adjacent to rear bearing 138.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer case for a vehicle having a normal two wheel drive mode and a selective four wheel drive mode, said transfer case comprising:
    a front shell boltably connected with a rear shell, said rear shell having a generally cylindrical interior depression with a blind end;
    a front axle output gear for powering a front axle of said vehicle, said front axle output gear being supported by bearings in said front and rear shells;
    a main input shaft supported by bearings in said front and rear shells, said main input shaft being torsionally connected with a transmission of said vehicle and a rear axle of said vehicle;
    an idler gear supported by bearings in said front and rear shells, said idler gear being meshed with said front axle output gear;
    a sprocket gear meshed with said idler gear and rotatively mounted on said main input shaft;
    a clutch housing torsionally connected with said sprocket gear;
    a hub torsionally connected with said main input shaft;
    a friction pack for torsionally connecting said clutch housing with said hub;
    an axially powered pressure plate for actuating said friction pack for torsionally connecting said main shaft with said front axle output gear; and
    a gerotor lubrication pump powered by said idler gear and axially aligned therewith, said pump being fitted within said cylindrical depression with an insertable inlet port, said inlet port insert having a generally radial inlet for intersecting with an oil inlet radially intersecting said cylindrical depression, said pump having inner and outer rotors rearward of said inlet port, and said pump having an outlet with a first part extending rearwardly from said blind end of said cylindrical depression, said outlet having a second part internally to said rear shell intersecting said outlet first part extending generally perpendicularly to said main input shaft in a reinforcing mound of said rear shell.

2. A transfer case for a vehicle of claim 1, wherein a front end of said main input shaft is directly supported by a bearing in said front shell.

3. A transfer case for a vehicle of claim 1, further comprising a pressure plate powered electrically.

4. A transfer case for a vehicle of claim 3, further including said pressure plate torsionally connected to said hub, an armature, torsionally connected to said clutch housing, a coil connected to said rear shell, a U-shaped coil housing surrounding the coil and rotatively mounted about said main input shaft, and a ball ramp with a first member axially spring biased away from said pressure plate and torsionally affixed to said main input shaft and said ball ramp having a second member torsionally affixed to said coil housing and rotatively mounted on said main input shaft.

5. A transfer case for a vehicle of claim 1, wherein said bearings supporting said main input shaft in said front and rear shells are installed from an interior of said front and rear shells.

6. A transfer case for a vehicle of claim 1, wherein said pump outlet second part intersects said main input shaft rearward of said bearing supporting said main input shaft in said rear shell.

7. A transfer case for a vehicle of claim 1, wherein said inlet port insert has an arched shaped pocket that tapers in width from one end to the other to collect oil and a pressure equalization pocket.

8. A method of changing the fluid properties of the gerotor lubrication pump of a transfer case of claim 7 by changing the radial position of the arched shaped pocket of said inlet port insert by replacing said inlet port insert with a different inlet port insert.

9. A transfer case for a vehicle of claim 1, wherein said depression blind end has an arched shaped pocket that tapers in width from one end to the other to distribute oil and a pressure equalization pocket.

10. A transfer case for a vehicle of claim 1 wherein said inlet port insert has a radial tab to prevent rotation.

11. A transfer case for a vehicle having a normal two wheel drive mode and a selective four wheel drive mode, said transfer case comprising:

a front shell boltably connected with a rear shell, said rear shell having a generally cylindrical interior depression with a blind end, said blind end having an arched shaped pocket that tapers in width from one end to the other and a pressure equalization pocket;

a front axle output gear for powering a front axle of said vehicle, said front output gear being supported by bearings in said front and rear shells;

a main input shaft directly supported by bearings accessible from an interior of said front and rear shells, said main input shaft being torsionally connected with a transmission of said vehicle and a rear axle of said vehicle;

an idler gear supported by bearings in said front and rear shells, said idler gear being meshed with said front axle output gear;

a sprocket gear meshed with said idler gear and rotatively mounted on said main input shaft;

a clutch housing torsionally connected with said sprocket gear;

a hub torsionally connected with said main input shaft;

a friction pack for torsionally connecting said clutch housing with said hub;

a pressure plate torsionally connected to said hub for actuating said friction pack for torsionally connecting said main shaft with said front axle output gear;

an armature torsionally connected to said clutch housing;

a coil connected to said rear shell;

a U-shaped coil housing surrounding the coil and rotatively mounted about said main input shaft;

a ball ramp with a first member axially spring biased away from said pressure plate and torsionally affixed to said main input shaft and said ball ramp having a second member torsionally affixed to said coil housing and rotatively mounted on said main input shaft; and a gerotor lubrication pump powered by said idler gear and axially aligned therewith, said pump being fitted within said cylindrical depression with an insertable inlet port, said port having a generally radial inlet for intersecting with an oil inlet radially intersecting said cylindrical depression, said inlet port having an arched shaped pocket that tapers in width from one end to the other to distribute oil and a pressure equalization pocket, said pump having inner and outer rotors rearward of said inlet port, and said pump having an outlet with a first part extending rearwardly from said blind end of said cylindrical depression, said outlet having a second part internally to said rear shell intersecting said outlet first part extending generally perpendicularly to said main input shaft in a reinforcing mound of said rear shell, and wherein said outlet second part intersects said main input shaft rearward of said bearing supporting said main input shaft in said rear shell.

12. A method of providing a transfer case for a vehicle having a normal two wheel drive mode and a selective four wheel drive mode, said transfer case comprising:

providing a front shell boltably connected with a rear shell, said rear shell having a generally cylindrical interior depression with a blind end;

providing a front axle output gear for powering a front axle of said vehicle, said front output gear being supported by bearings in said front and rear shells;

providing a main input shaft supported by bearings in said front and rear shells, said main input shaft being torsionally connected with a transmission of said vehicle and a rear axle of said vehicle;

providing an idler gear bearing supported in said front and rear shells, said idler gear being meshed with said front axle output gear;

providing a sprocket gear meshed with said idler gear and rotatively mounted on said main input gear;

providing a clutch housing torsionally connected with aid sprocket gear;

providing a hub torsionally connected with said main input gear;

providing a friction pack for torsionally connecting said clutch housing with said hub;

providing a powered pressure plate for actuating said friction pack for torsionally connecting said main shaft with said front axle output gear; and providing a gerotor lubrication pump powered by said idler gear and axially aligned therewith, said pump being fitted within said cylindrical depression with an insertable inlet port, said port having a generally radial inlet for intersecting with an oil inlet radially intersecting said cylindrical depression, said pump having inner and outer rotors rearward of said inlet port, and said pump having an outlet with a first part extending rearwardly from a blind end of said cylindrical depression, said outlet having a second part internally to said rear shell intersecting said outlet first part extending generally perpendicularly to said main input shaft in a reinforcing mound of said rear shell.

\* \* \* \* \*